US012281780B2

(12) United States Patent
Nichols

(10) Patent No.: US 12,281,780 B2
(45) Date of Patent: Apr. 22, 2025

(54) RAIL LIGHTING SYSTEM

(71) Applicant: Avid Labs, LLC, Fort Wayne, IN (US)

(72) Inventor: Joel Nichols, Fort Wayne, IN (US)

( * ) Notice: Subject to any disclaimer, the term of this patent is extended or adjusted under 35 U.S.C. 154(b) by 0 days.

(21) Appl. No.: 18/433,550

(22) Filed: Feb. 6, 2024

(65) Prior Publication Data

US 2024/0263765 A1 Aug. 8, 2024

Related U.S. Application Data

(60) Provisional application No. 63/483,825, filed on Feb. 8, 2023.

(51) Int. Cl.

| | |
|---|---|
| ***F21V 21/02*** | (2006.01) |
| ***F21S 4/24*** | (2016.01) |
| ***F21S 8/00*** | (2006.01) |
| ***F21V 5/00*** | (2018.01) |
| ***F21V 21/08*** | (2006.01) |
| *F21Y 105/16* | (2016.01) |
| *F21Y 115/10* | (2016.01) |

(52) U.S. Cl.

CPC .............. *F21V 21/025* (2013.01); *F21S 4/24* (2016.01); *F21S 8/036* (2013.01); *F21V 5/008* (2013.01); *F21V 21/0808* (2013.01); *F21Y 2105/16* (2016.08); *F21Y 2115/10* (2016.08)

(58) Field of Classification Search

CPC .... F21V 21/025; F21V 5/008; F21V 21/0808; F21S 4/24; F21S 8/036; F21Y 2105/16; F21Y 2115/10

See application file for complete search history.

(56) References Cited

U.S. PATENT DOCUMENTS

| | | | | |
|---|---|---|---|---|
| 9,518,716 B1 * | 12/2016 | Householder | F21S 8/00 | |
| 10,520,447 B2 | 12/2019 | Nichols et al. | | |
| 10,823,366 B2 * | 11/2020 | Hawks | F21V 3/02 | |
| 10,845,034 B2 | 11/2020 | Nichols et al. | | |
| 2006/0164833 A1 * | 7/2006 | Parkyn | F21V 5/04 | 362/240 |
| 2015/0241034 A1 * | 8/2015 | Dankelmann | F21S 4/28 | 29/592.1 |
| 2016/0356454 A1 * | 12/2016 | Camarota | F21V 21/005 | |
| 2017/0038036 A1 * | 2/2017 | Guerrieri | F21S 4/24 | |

FOREIGN PATENT DOCUMENTS

| | | | |
|---|---|---|---|
| DE | 102013110317 A1 * | 3/2015 | F21S 4/28 |

OTHER PUBLICATIONS

English translation of Heise DE-102013110317-A1 (Year: 2015).*
Smart vision lights TSLOT300 Extrusion Light Linear Light Product Data Sheet.

* cited by examiner

*Primary Examiner* — Evan P Dzierzynski

(57) ABSTRACT

A tape light carrier system includes an elongate structure having a tape light receiving recess along its length. An inner and outer set of slots are arranged on inner sides of the tape light receiving recess. An inner covering lens is engaged with the inner set of slots and an outer covering lens is engaged with the outer set of slots. A flexible linear light source is affixed to the bottom of the tape light receiving recess using an adhesive. The inner covering lens is arranged in an arc and holds the flexible linear light source in position along the bottom of the tape light receiving recess. A T-slot may be arranged along the underside of the elongate structure, and barn door type shutters may be arranged along the sides of the tape light carrier.

16 Claims, 5 Drawing Sheets

RAIL LIGHTING SYSTEM

CROSS REFERENCE TO RELATED APPLICATIONS

The present application claims priority to U.S. provisional patent application Ser. No. 63/483,825 entitled "RAIL LIGHTING SYSTEM" which is incorporated herein by reference.

BACKGROUND

Field of Invention

Embodiments of the Rail Lighting System described herein generally relate to a Light Emitting Diode (LED) tape light carrier system. The Rail Lighting System is designed to securely and permanently retain an LED tape light while installed in a vertical or downward facing arrangement.

Related Art

LED strip lights, also known as LED tape, tape lights, or ribbon lights, are generally linear flexible circuit boards having surface mounted devices (SMD) in the form of multiple LEDs and their supporting circuitry arranged along a length of narrow flexible strip or band. LED strip lights often come with an adhesive backing. Originally, LED strip lights were used solely in accent lighting, backlighting, task lighting, and decorative lighting applications. With the increased luminous efficacy of higher power LEDs, LED strip lights are now used in applications such as high brightness task lighting, and as replacements for fluorescent and halogen lighting fixtures. LED tape light is widely available in the lighting industry and is both cost effective and easy to install. LED tape light is very versatile and can be cut to the correct length with ease and without requiring additional tools. LED tape light is available in indoor versions, weatherproof and waterproof versions, and color changing versions, and comes in variable widths normally between eight and fifteen millimeters. Securing LED tape light is usually achieved using an adhesive backing with a cover that is removed, whereupon the product is adhered to the end use item.

One problem that is sometimes encountered with known LED tape lighting installations is that the adhesive backing may not adhere fully to the mounting surface. When the LED tape light is installed in a vertical or downward facing arrangement, the adhesive may be insufficient to hold the LED tape light in place, either immediately, or over a period of time as the adhesive medium slowly separates from the mounting surface. Even if this does not happen within a short time, over longer periods of time adhesives can dry out and lose their effectiveness, so that the LED tape light may still come loose from its mounting surface.

The present inventor's own patent, U.S. Pat. No. 10,845,034, dealt with this problem by fully encapsulating the LED tape light in a transparent or semi-translucent flexible holding carrier. However, this design requires that the holding carrier be sufficiently deformable that the slot within the holding carrier can be opened far enough to insert the tape light into it. Moreover, it requires that the transparent or semi-translucent flexible holding carrier then be supported by an extrusion or other supporting structure. This previous design, therefore, required multiple steps involving the manipulation, deforming, and or stressing of the tape light and its holding carrier, as well as the additional step of affixing the holding carrier to the extrusion or other supporting structure. Often, the extrusion or other supporting structure by design had to significantly restrict the spread of light emanating from the tape light.

Accordingly, there is an unmet need for a rail lighting system that will securely and permanently retain an LED tape light while installed in a vertical or downward facing arrangement, while requiring a minimum of assembly steps, and a minimum of manipulation, deforming, and or stressing of the tape light during assembly and use.

SUMMARY

Embodiments of the Rail Lighting System described herein relate to a tape light carrier system that securely and permanently retains an LED tape light while installed in a vertical or downward facing arrangement. The Rail Lighting System includes an elongate structure which may, for non-limiting example, be an aluminum extrusion to which one or two strips of LED tape light are affixed. While the elongate structure is herein illustrated as an aluminum extrusion, for non-limiting example 6061 T6 aluminum, it is contemplated that the elongate structure may be an extrusion of other material such as other metals, polymers, ceramics, composites, and etcetera. Moreover, the elongate structure may be fashioned using other techniques such as molding or casting, for non-limiting example. The elongate structure may for non-limiting example be clear anodized.

The elongate structure includes a tape light receiving recess along its length in the direction of illumination. An LED tape light is affixed by way of adhesive along the bottom of the tape light receiving recess, so that the LEDs face the outward opening along the length of the tape light receiving recess. While LED tape light is discussed herein as the lighting source to be affixed within the elongate structure of the Rail Lighting System, it is contemplated that other flexible linear light sources adapted to be affixed using adhesive such as adhesive backing may be used. In each side of the tape light receiving recess, there are two slots. The inner set of slots are used to retain an inner covering lens, and the outer set of slots are used to retain an outer covering lens. The upper corners of the outer slots may be provided with a 45° chamfer. The inner covering lens is shaped in such a way that it acts as a barrier and holds the LED tape light in position along the bottom of the tape light receiving recess. In at least one embodiment, the inner covering lens is specifically shaped so that, upon installation, it forms an arc, thereby resiliently compressing the LED tape light into position along the bottom of the tape light receiving recess. The outer covering lens gives the Rail Lighting System its outer form, and may be curved or flat in shape, for non-limiting example. The outer covering lens may further be fully transparent or semi-opaque, thereby acting as a diffuser. While both of the inner covering lens and the outer covering lens are shown as formed from transparent or semi-opaque sheet, either of the inner covering lens and the outer covering lens, or both, may be formed using other methods and/or may have cross-sections of varying thickness.

The Rail Lighting System elongate structure may further include internal strain relief radii between the bottom of the tape light receiving recess and the sides of the tape light receiving recess. A bottom T-slot may extend along the length of the side of the elongate structure opposite from the tape light receiving recess, being the bottom of the elongate structure, and may be compatible with standard mounting hardware such as T-nuts or T-bolts for non-limiting example.

Outer corner chamfers may be arranged between the bottom of the elongate structure and the sides of the elongate structure. Outer cylindrical slots may be arranged along the length of the outer corner chamfers. Barn door brackets may be inserted into the outer cylindrical slots and may be used to attach a "barn door." The barn door is, for non-limiting example, a flat piece of light blocking material that is used to control the extent of lateral illumination provided by the Rail Lighting System.

By having the outer cylindrical slots arranged along the length of the outer corner chamfers and inwards from the planes defined by the sides of the elongate structure, the barn door brackets may be configured so that the barn door(s) can be pivoted from about 90° outward from the sides of the elongate structure to completely flush to the sides of the elongate structure. This allows for a range of lateral illumination from about 180° of lateral illumination to a narrow strip of vertical illumination only. Moreover, it also allows the barn door to rotate out into more open positions while still having its edge closest to the point of rotation still remain below the edge of the elongate structure, thereby blocking light from projecting rearward.

For non-limiting example, the elongate structure may be about 1.33 inches wide by about 0.98 inches tall. The tape light receiving recess may be about 1.15 wide, and the outer and inner slots may be about 0.06 inches deep with rounded corners (except for the 45° chamfer mentioned previously). The strain relief radii may be about 0.05 in radius, while the outer cylindrical slots may be about 0.09 in radius. The bottom T-slot may be 0.32 wide at its opening, 0.59 wide at its widest, and 0.24 deep. If made of aluminum, the elongate structure may weigh 0.37 pounds per 12 inches of length.

For non-limiting example, an advantage of the Rail Lighting System is that it allows the use of adhesive backed LED tape light within a rigid linear elongate structure installed in a vertical or downward facing arrangement, without the risk that the LED tape light will pull away from its mounting surface. For another non-limiting example, an advantage of the Rail Lighting System is that its elongate structure may be formed using inexpensive extrusion tooling. For another non-limiting example, an advantage of the Rail Lighting System is that it requires a minimum of assembly steps, and a minimum of manipulation, deforming, and or stressing of the tape light during assembly and use. For another non-limiting example, an advantage of the Rail Lighting System is that it allows for the use of a barn door light blocking arrangement.

According to one embodiment of the Rail Lighting System, a tape light carrier system includes an elongate structure having a tape light receiving recess along its length. An inner set of slots and an outer set of slots are arranged on the inner sides of the tape light receiving recess. An inner covering lens is engaged with the inner set of slots. An outer covering lens is engaged with the outer set of slots. A flexible linear light source is affixed to the bottom of the tape light receiving recess using an adhesive. The inner covering lens is arranged as a barrier and holds the flexible linear light source in position along the bottom of the tape light receiving recess.

According to another embodiment of the Rail Lighting System, a method of illumination includes several steps. The first step is providing an elongate structure with a tape light receiving recess along its length. The second step is arranging an inner set of slots and an outer set of slots on inner sides of the tape light receiving recess. The third step is affixing a flexible linear light source to a bottom of the tape light receiving recess using an adhesive. The fourth step is engaging an inner covering lens with the inner set of slots, wherein the inner covering lens is arranged as a barrier and holds the flexible linear light source in position along the bottom of the tape light receiving recess. The fifth step is engaging an outer covering lens with the outer set of slots.

DESCRIPTION OF THE DRAWINGS

The above-mentioned and other features of embodiments of the present Rail Lighting System, and the manner of their working, will become more apparent and will be better understood by reference to the following description of embodiments of the Rail Lighting System taken in conjunction with the accompanying drawings, wherein.

Corresponding reference numbers indicate corresponding parts throughout the several views. The exemplifications set out herein illustrate embodiments of the Rail Lighting System, and such exemplifications are not to be construed as limiting the scope of the claims in any manner.

DETAILED DESCRIPTION

The following detailed description and appended drawing describe and illustrate various exemplary embodiments of the invention. The description and drawings serve to enable one skilled in the art to make and use the invention and are not intended to limit the scope of the invention in any manner. In respect of any methods disclosed and illustrated, the steps presented are exemplary in nature, and thus, the order of the steps is not necessary or critical.

Figure 1:
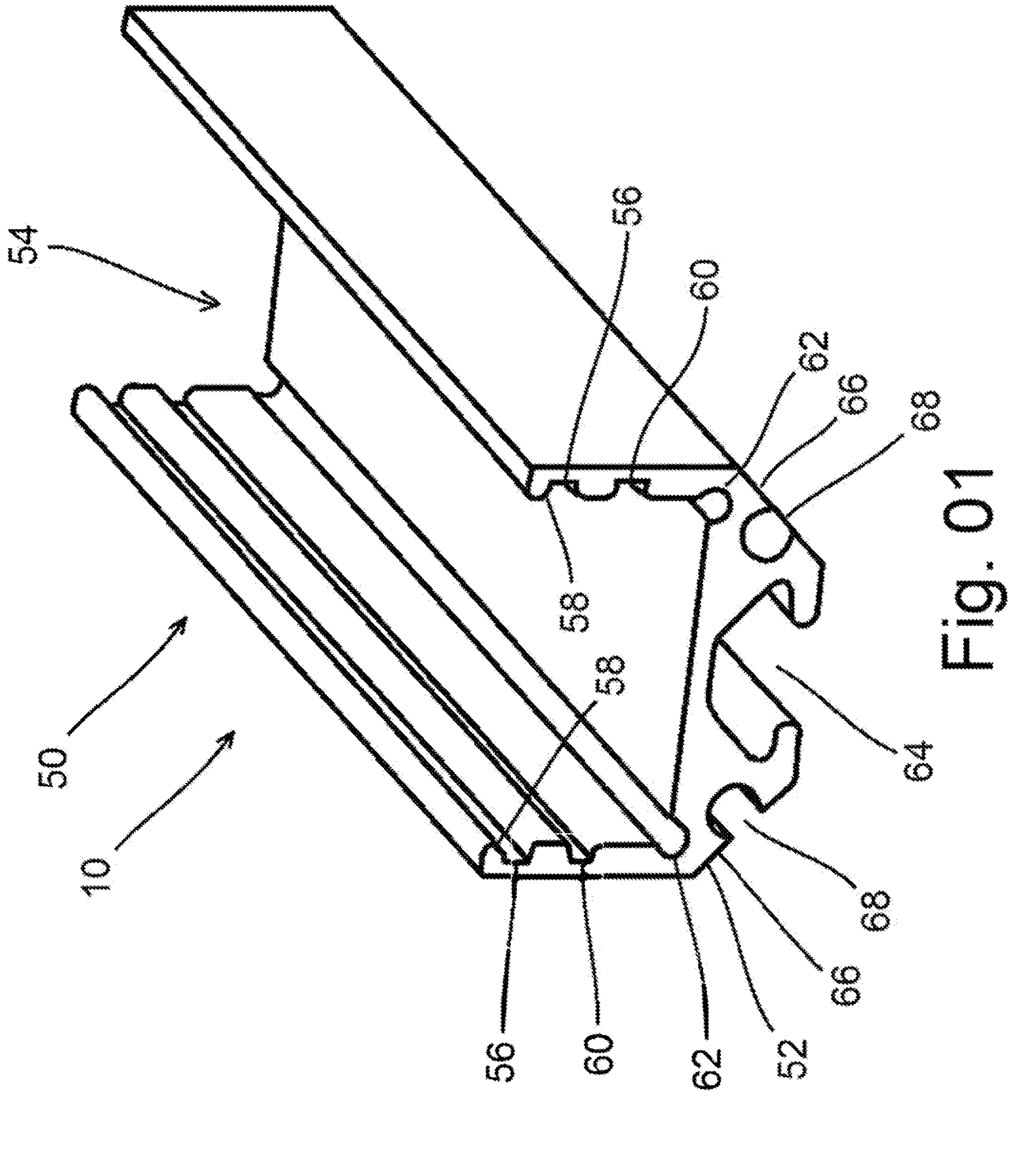
FIG. 1 is an isometric end top view of an embodiment of the Rail Lighting System, as described herein.
Figure 2:
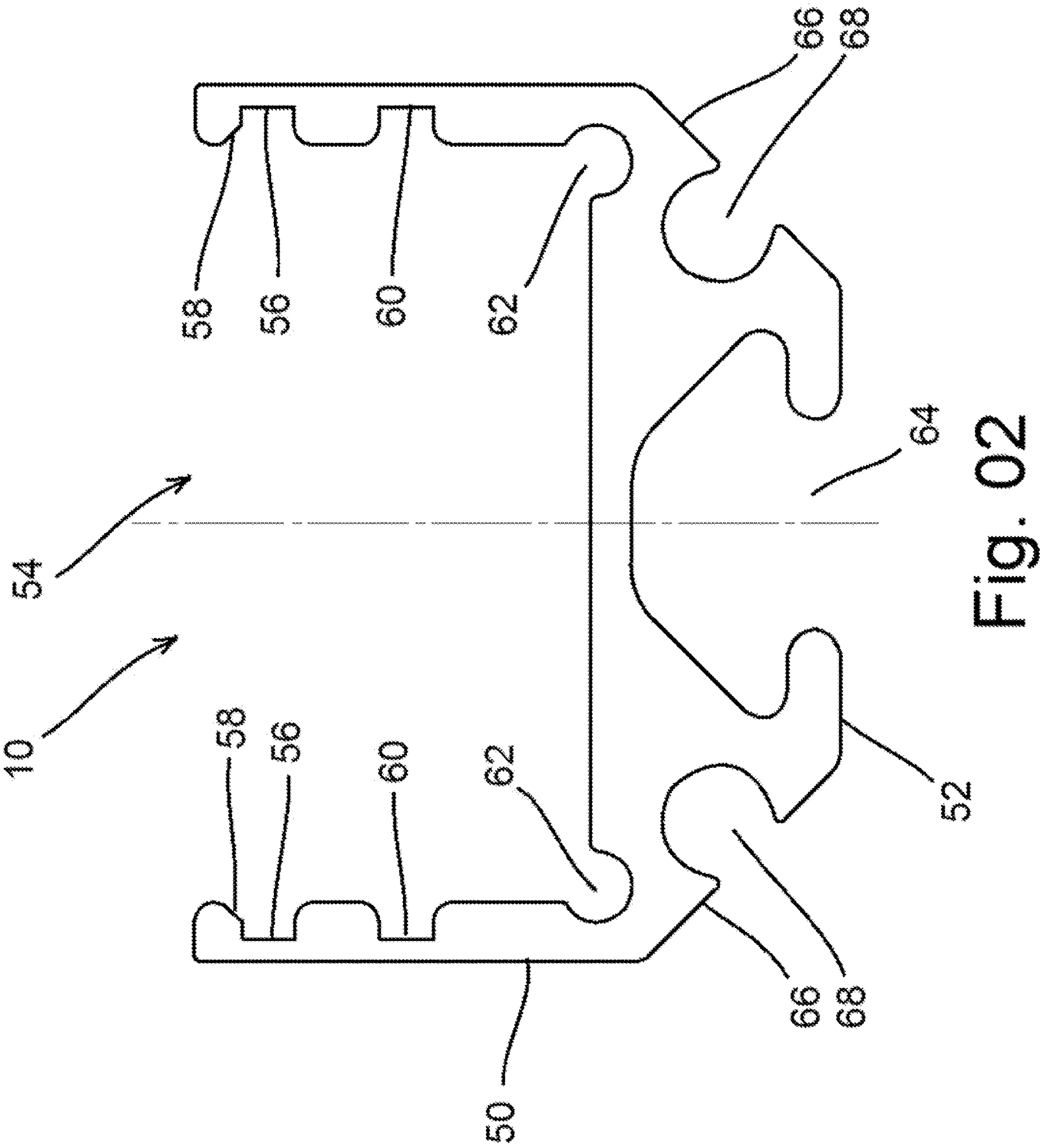
FIGS. 2 through 5 are end views of embodiments of the Rail Lighting System, as described herein.

Turning now to FIGS. 1 and 2, an embodiment of the Rail Lighting System 10 is shown in perspective view and end view, respectively. Elongate structure 50 is formed, for non-limiting example as an aluminum extrusion, and is provided with a base 52 and a tape light receiving recess 54. The tape light receiving recess 54 is provided with outer slots 56 and inner slots 60. At least the outer slots 56 may be provided with 45° chamfers 58. The sides and bottom of the tape light receiving recess 54 may be provided with strain relief radii 62. A bottom T-slot 64 is formed in the base 52 and may be compatible with standard mounting hardware such as T-nuts or T-bolts for non-limiting example. Outer corner chamfers 66 may be formed in the base 52, and may be provided with outer cylindrical slots 68.

Figure 3:
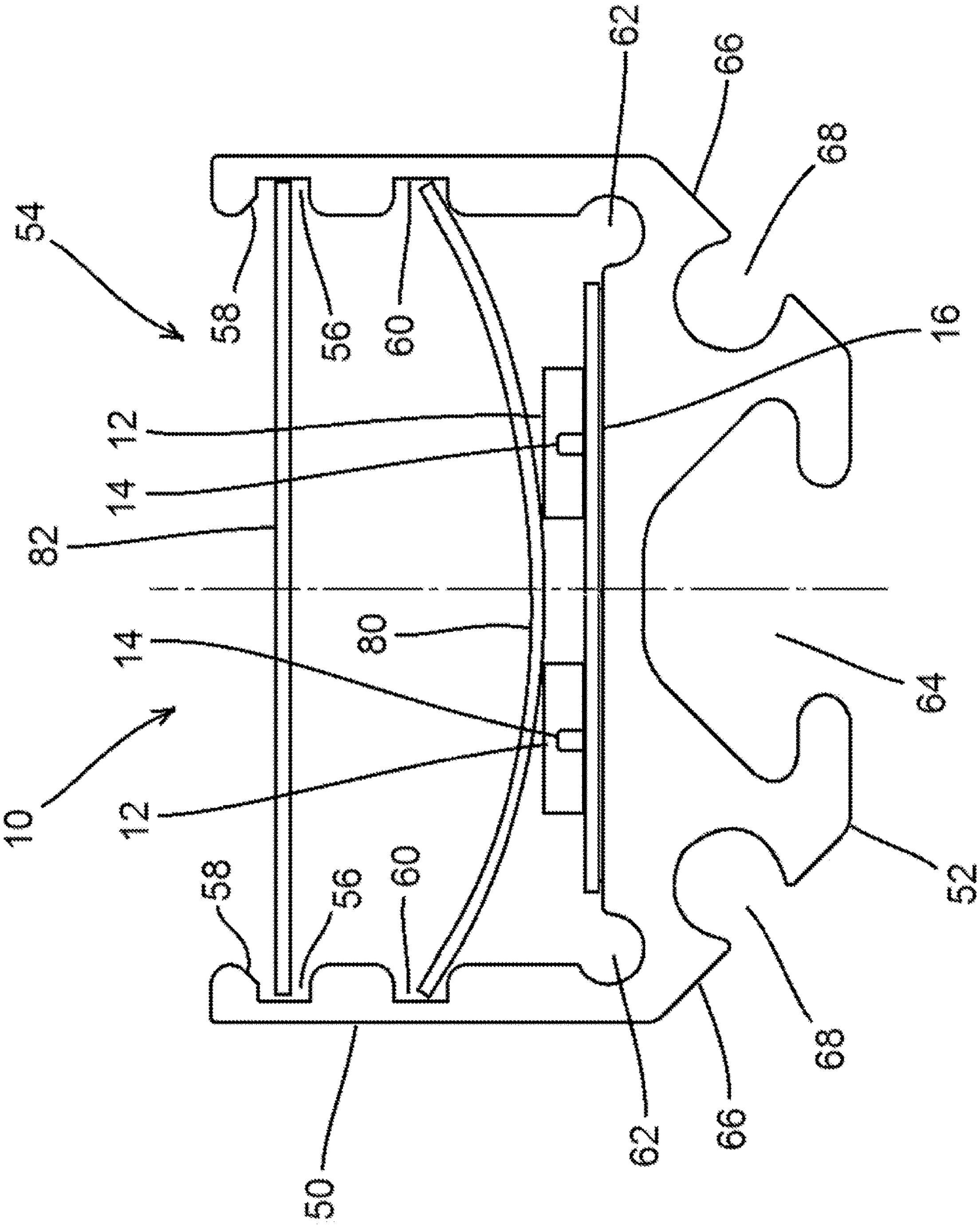
Figure 4:
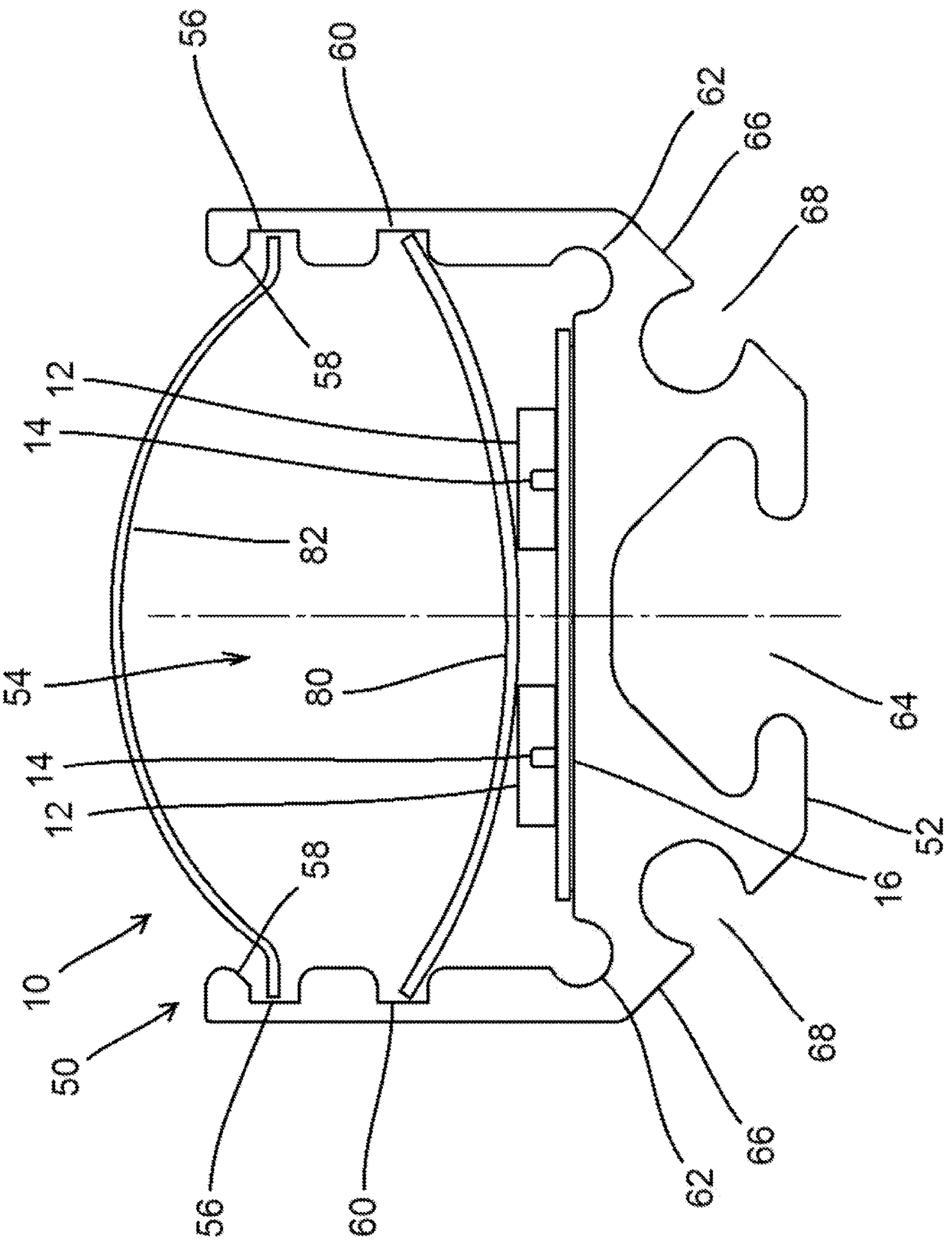

FIGS. 3 and 4 show an embodiment of the Rail Lighting System 10 similar to the embodiment shown in FIGS. 1 and 2. Elongate structure 50 is again provided with a base 52 and a tape light receiving recess 54 having outer slots 56 and inner slots 60. The outer slots 56 may again be provided with 45° chamfers 58, and the sides and bottom of the tape light receiving recess 54 may again be provided with strain relief radii 62. A bottom T-slot 64 is again formed in the base 52. Outer corner chamfers 66 are again formed in the base 52 and are provided with outer cylindrical slots 68. LED tape lights 12 are installed at the bottom of the tape light receiving recess 54 using adhesive 16, which may be pre-applied to the LED tape lights 12. The LED tape lights 12 are provided with multiple LEDs 14 along their length. An inner covering lens 80 is engaged with the inner slots 60 and extends along the length of the elongate structure 50. The inner covering lens 80 is bowed inward upon installation and thereafter remains in a bowed configuration. In this way, the inner covering lens 80 acts as a barrier and holds the LED tape lights 12 in position along the bottom of the tape light receiving recess 54. An outer covering lens 82 is engaged with the outer slots 56 and gives the Rail Lighting System 10 its outer form. For non-limiting example, the outer covering lens 82 in FIG. 3 is flush with the sides of the tape light receiving recess 54, whereas in FIG. 4, the outer covering lens 82 is curved and extends above the sides of the tape light receiving recess 54.

Figure 5:
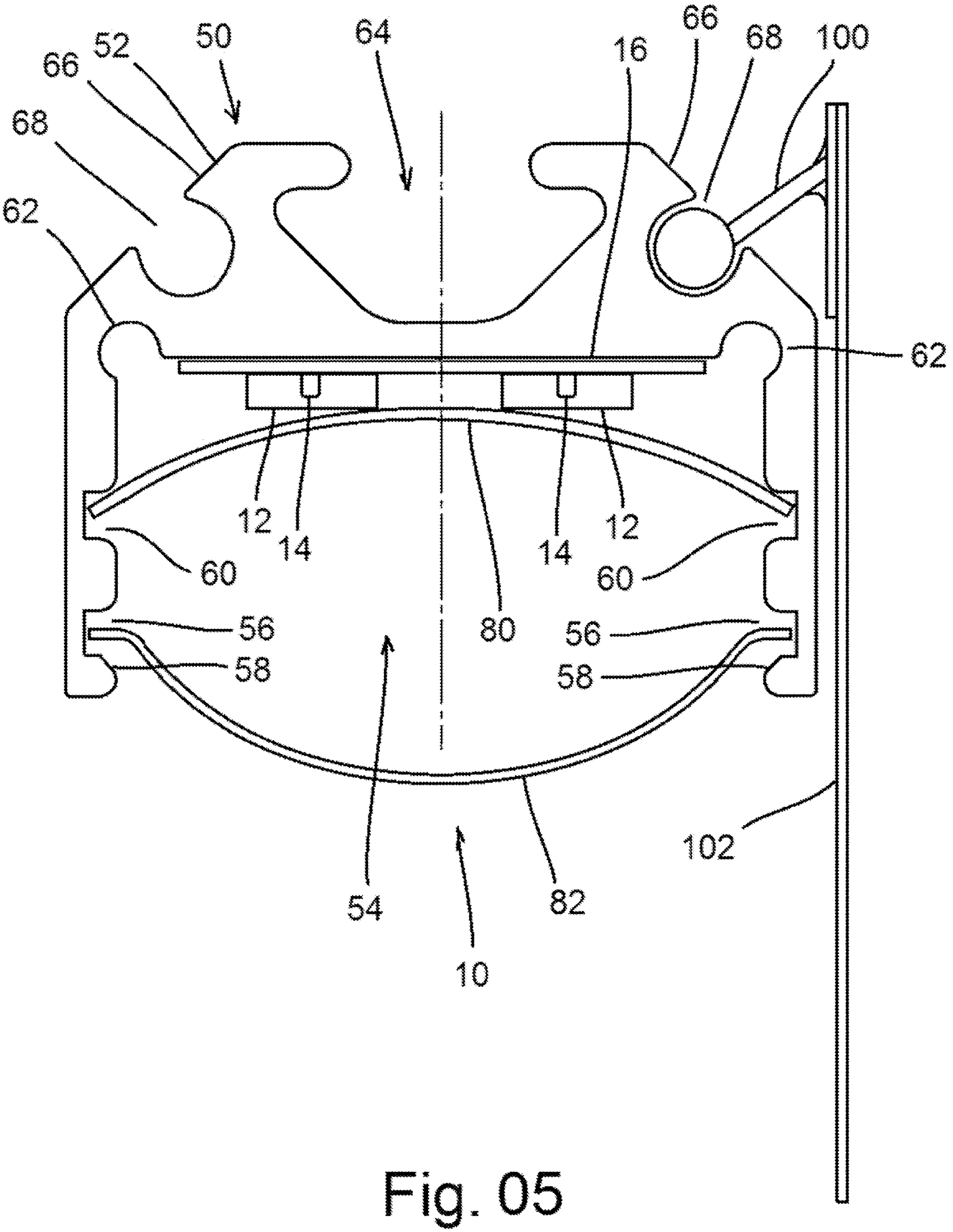

FIG. 5 shows an embodiment of the Rail Lighting System 10 similar to the embodiments shown in FIGS. 1 through 4. Elongate structure 50 is again provided with a base 52 and a tape light receiving recess 54 having outer slots 56 and inner slots 60, the outer slots 56 again being provided with 45° chamfers 58, and the sides and bottom of the tape light receiving recess 54 again being provided with strain relief radii 62. A bottom T-slot 64, outer corner chamfers 66, and outer cylindrical slots 68 are again formed in the base 52. LED tape lights 12 are again installed at the bottom of the tape light receiving recess 54 using adhesive 16, the LED tape lights 12 again being provided with multiple LEDs 14 along their length. An inner covering lens 80 is again engaged with the inner slots 60, extending along the length of the elongate structure 50, and is again in a bowed configuration, thereby acting to hold the LED tape lights 12 in position along the bottom of the tape light receiving recess 54. An outer covering lens 82 is again engaged with the outer slots 56. A barn door bracket 100 is pivotally engaged with one of the outer cylindrical slots 68. A barn door 102 is attached to the barn door bracket 100, so that the barn door 102 may be pivoted from an approximately vertical position as shown, to an approximately horizontal position (not shown), approximately parallel with the bottom of the base 52. Another barn door 102 and barn door bracket (not shown) may be engaged with the other outer cylindrical slot 68, thereby controlling the extent of lateral illumination provided on either side of the Rail Lighting System 10.

While the Rail Lighting System has been described with respect to at least one embodiment, the Rail Lighting System can be further modified within the spirit and scope of this disclosure, as demonstrated previously. This application is therefore intended to cover any variations, uses, or adaptations of the Rail Lighting System using its general principles. Further, this application is intended to cover such departures from the present disclosure as come within known or customary practice in the art to which the disclosure pertains and which fall within the limits of the appended claims.

REFERENCE NUMBER LISTING

| | |
|---|---|
| 10 | Rail Lighting System |
| 12 | LED tape light |
| 14 | LEDs |
| 16 | Adhesive |
| 50 | Elongate structure (extrusion) |
| 52 | Base |
| 54 | Tape light receiving recess |
| 56 | Outer slots |
| 58 | 45° chamfer |
| 60 | Inner slots |
| 62 | Strain relief radii |
| 64 | Bottom T-slot |
| 66 | Outer corner chamfers |
| 68 | Outer cylindrical slots |
| 80 | Inner covering lens |
| 82 | Outer covering lens |
| 100 | Barn door bracket |
| 102 | Barn door |

What is claimed is:

1. A tape light carrier system, comprising:

an elongate structure having a tape light receiving recess along its length;

an inner set of slots and an outer set of slots arranged on inner sides of the tape light receiving recess;

an inner covering lens engaged with the inner set of slots;

an outer covering lens engaged with the outer set of slots; and a flexible linear light source affixed to a bottom of the tape light receiving recess using an adhesive; wherein:

the inner covering lens is arranged as a barrier and holds the flexible linear light source in position along the bottom of the tape light receiving recess, the flexible linear light source further comprises LED tape light, and the inner covering lens forms an arc and resiliently compresses the LED tape light into the bottom of the tape light receiving recess.

2. The tape light carrier system of claim 1, wherein:

the adhesive used to affix the flexible linear light source to the bottom of the tape light receiving recess further comprises adhesive tape.

3. The tape light carrier system of claim 1, wherein:

the outer covering lens being one of curved and flat in shape; and the outer covering lens being one of fully transparent and semi-opaque.

4. The tape light carrier system of claim 1, wherein:

the elongate structure further comprises an aluminum extrusion.

5. The tape light carrier system of claim 4, further comprising:

a mounting feature arranged along a side of the elongate structure opposite from the tape light receiving recess.

6. The tape light carrier system of claim 5, wherein:

the mounting feature further comprises a bottom T-slot.

7. The tape light carrier system of claim 4, further comprising:

an outer corner chamfer arranged between the side of the elongate structure opposite from the tape light receiving recess and each lateral side of the elongate structure;

outer cylindrical slots arranged along each outer corner chamfer;

at least one barn door bracket being inserted into at least one outer cylindrical slot;

a barn door attached to the at least one barn door bracket, the barn door being a flat piece of light blocking material.

8. The tape light carrier system of claim 7, wherein:

the barn door brackets being configured so that the barn door can be pivoted from about 90° outward from the lateral side of the elongate structure to about flush to the lateral side of the elongate structure.

9. A method of illumination, comprising the steps of:

providing an elongate structure with a tape light receiving recess along its length;

arranging an inner set of slots and an outer set of slots on inner sides of the tape light receiving recess;

affixing a flexible linear light source to a bottom of the tape light receiving recess using an adhesive;

engaging an inner covering lens with the inner set of slots, wherein the inner covering lens is arranged as a barrier and holds the flexible linear light source in position along the bottom of the tape light receiving recess; and engaging an outer covering lens with the outer set of slots, wherein:

the flexible linear light source further comprises LED tape light, and the inner covering lens forms an arc and resiliently compresses the LED tape light into the bottom of the tape light receiving recess.

10. The method of claim 9, wherein:

the adhesive used to affix the flexible linear light source to the bottom of the tape light receiving recess further comprises adhesive tape.

11. The method of claim 9, wherein:

the outer covering lens being one of curved and flat in shape; and the outer covering lens being one of fully transparent and semi-opaque.

12. The method of claim 9, wherein:

the elongate structure further comprises an aluminum extrusion.

13. The method of claim 12, further comprising the step of:

arranging a mounting feature along a side of the elongate structure opposite from the tape light receiving recess.

14. The method of claim 13, wherein:

the mounting feature further comprises a bottom T-slot.

15. The method of claim 12, further comprising the steps of:

arranging an outer corner chamfer between the side of the elongate structure opposite from the tape light receiving recess and each lateral side of the elongate structure;

arranging outer cylindrical slots along each outer corner chamfer;

inserting at least one barn door bracket into at least one outer cylindrical slot;

attaching a barn door to the at least one barn door bracket, the barn door being a flat piece of light blocking material.

16. The method of claim 15, wherein:

the barn door brackets being configured so that the barn door can be pivoted from about 90° outward from the lateral side of the elongate structure to about flush to the lateral side of the elongate structure.

* * * * *